(12) United States Patent
Lin (10) Patent No.: US 8,478,978 B2
(45) Date of Patent: Jul. 2, 2013

(54) SYSTEM AND ELECTRONIC DEVICE HAVING MULTIPLE OPERATING SYSTEMS AND OPERATING METHOD THEREOF

(75) Inventor: Chien-Liang Lin, Taoyuan (TW)

(73) Assignee: HTC Corporation, Taoyuan County (TW)

( * ) Notice: Subject to any disclaimer, the term of this patent is extended or adjusted under 35 U.S.C. 154(b) by 1148 days.

(21) Appl. No.: 12/111,213

(22) Filed: Apr. 29, 2008

(65) Prior Publication Data

US 2009/0063845 A1 Mar. 5, 2009

Related U.S. Application Data

(60) Provisional application No. 60/970,249, filed on Sep. 5, 2007.

(51) Int. Cl.
*G06F 9/00* (2006.01)
(52) U.S. Cl.
USPC .......................................................... 713/100
(58) Field of Classification Search
USPC .......................................................... 713/100
See application file for complete search history.

(56) References Cited

U.S. PATENT DOCUMENTS

| | | | | |
|---|---|---|---|---|
| 6,003,100 | A * | 12/1999 | Lee | 710/301 |
| 6,327,653 | B1 * | 12/2001 | Lee | 713/100 |
| 6,976,180 | B2 | 12/2005 | Cupps et al. | |
| 7,184,003 | B2 | 2/2007 | Cupps et al. | |
| 7,231,531 | B2 * | 6/2007 | Cupps et al. | 713/322 |
| 7,343,484 | B2 * | 3/2008 | Du et al. | 713/2 |
| 7,356,677 | B1 * | 4/2008 | Rafizadeh | 713/1 |
| 2002/0184328 | A1 * | 12/2002 | Richardson et al. | 709/213 |
| 2003/0204708 | A1 | 10/2003 | Hulme et al. | |
| 2004/0039950 | A1 | 2/2004 | Okamoto et al. | |
| 2005/0216722 | A1 * | 9/2005 | Kim et al. | 713/2 |
| 2005/0289361 | A1 * | 12/2005 | Sutardja | 713/300 |
| 2007/0038875 | A1 | 2/2007 | Cupps et al. | |

(Continued)

FOREIGN PATENT DOCUMENTS

| | | |
|---|---|---|
| TW | 1279678 | 4/2007 |
| WO | 2004021684 | 3/2004 |
| WO | 2004064119 | 7/2004 |

OTHER PUBLICATIONS

Managing System Power (Windows XP), 2005, NEC Computers S.A.S, https://computing hardware.web.cern.ch/ComputingHardware/doc/NEC/P550-UserGuide/13-03-01_managing_system_power_Windows_xp.htm.*

(Continued)

*Primary Examiner* — Mark Connolly
(74) *Attorney, Agent, or Firm* — Jianq Chyun IP Office (57) ABSTRACT

A system and an electronic device having multiple operating systems and an operating method thereof are provided. The electronic device includes a display and a system having a first operating system, a second operating system, and an embedded controller. The first operating system consumes less power than the second operating system. The embedded controller receives an input signal to switch between the first operating system and the second operating system and displays an interface of the switched operating system on a screen of the display. The first operating system and the embedded controller remain in an alive state after the electronic device is turned on, and the second operating system enters a non-working state after a preset idle time.

8 Claims, 8 Drawing Sheets

U.S. PATENT DOCUMENTS

| | | |
|---|---|---|
| 2007/0043961 A1 | 2/2007 | Cupps et al. |
| 2007/0055860 A1 | 3/2007 | Wang |
| 2007/0083785 A1 | 4/2007 | Sutardja |
| 2008/0162914 A1* | 7/2008 | Adrangi et al. .................. 713/2 |
| 2008/0184042 A1* | 7/2008 | Parks et al. .................. 713/300 |
| 2009/0058887 A1* | 3/2009 | Lin .............................. 345/690 |
| 2009/0061838 A1* | 3/2009 | Lin .............................. 455/418 |
| 2009/0063845 A1* | 3/2009 | Lin .............................. 713/100 |

OTHER PUBLICATIONS

"Office Action of European counterpart application", issued on May 15, 2009, p1-p5.

* cited by examiner

| # | State | | Current screen owner | Button pressed | | Changed state | | Next screen owner |
|---|---|---|---|---|---|---|---|---|
| | XP | CE | | Power button | Switch button | XP | CE | |
| 1 | OFF | OFF | XP/CE | Pressed | x | ON | ON | XP/CE |
| 2 | /////// | /////// | /////// | /////// | /////// | /////// | /////// | /////// |
| 3 | OFF | OFF | XP | x | Pressed | OFF | OFF | XP |
| 4 | /////// | /////// | /////// | /////// | /////// | /////// | /////// | /////// |
| 5 | OFF | ON | XP | Pressed | x | ON | ON | XP |
| 6 | OFF | ON | CE | Pressed | x | ON | SLEEP | XP |
| 7 | OFF | ON | XP | x | Pressed | OFF | ON | XP |
| 8 | OFF | ON | CE | x | Pressed | OFF | SLEEP | CE |
| 9 | OFF | SLEEP | XP | Pressed | x | ON | SLEEP | XP |
| 10 | OFF | SLEEP | CE | Pressed | x | ON | SLEEP | XP |
| 11 | OFF | SLEEP | XP | x | Pressed | OFF | SLEEP | XP |
| 12 | OFF | SLEEP | CE | x | Pressed | OFF | ON | CE |
| 13 | /////// | /////// | /////// | /////// | /////// | /////// | /////// | /////// |
| 14 | /////// | /////// | /////// | /////// | /////// | /////// | /////// | /////// |
| 15 | /////// | /////// | /////// | /////// | /////// | /////// | /////// | /////// |
| 16 | /////// | /////// | /////// | /////// | /////// | /////// | /////// | /////// |
| 17 | ON | OFF | XP | Pressed | x | OFF | ON | XP |
| 18 | ON | | CE | Pressed | x | ON | ON | CE |
| 19 | ON | OFF | XP | x | Pressed | ON | ON | CE |
| 20 | ON | OFF | CE | x | Pressed | ON | SLEEP | CE |
| 21 | ON | SLEEP | XP | Pressed | x | OFF | SLEEP | XP |
| 22 | ON | SLEEP | CE | Pressed | x | ON | SLEEP | XP |
| 23 | ON | SLEEP | XP | x | Pressed | ON | ON | CE |
| 24 | ON | SLEEP | CE | x | Pressed | ON | ON | CE |

Replacement Sheet

FIG. 5

| Button<br>State | A | | B | |
|---|---|---|---|---|
| 1 | 3 | 4 | 1 | 3 |
| 3 | 1 | | 4 | |
| 4 | 1 | | 3 | |

SYSTEM AND ELECTRONIC DEVICE HAVING MULTIPLE OPERATING SYSTEMS AND OPERATING METHOD THEREOF

CROSS-REFERENCE TO RELATED APPLICATION

This application claims the priority benefit of U.S. provisional application Ser. No. 60/970,249, filed on Sep. 5, 2007. The entirety of the above-mentioned patent application is hereby incorporated by reference herein and made a part of this specification.

BACKGROUND OF THE INVENTION

1. Field of the Invention

The present invention generally relates to a power management method, in particular, to a power management method adaptable to an electronic device having multiple operating systems.

2. Description of Related Art

To keep up with the bustling pace of modern human life, various portable and space-saving electronic devices have been put forward one after another. For example, smart phones are not only equipped all functions of a conventional communication device, but also allow users to achieve purposes such as document writing, E-mail receiving/sending, network accessing, or the use of real-time communication software through a built-in Windows operating system (Windows OS). That is to say, such hand-held communication devices may not only be used to make phone calls, but also serves as a miniature PC with versatile functions. Further, with the progress of wireless network technology, those functions can be used free from time and space limitations. Therefore, such devices have become an indispensable tool in a modern life in pursuit of efficiency.

The architecture of such hand-held communication devices has an embedded system, and works through a Windows mobile OS such as Windows CE. However, the function of the Windows mobile OS may be limited by the performance of the processor used in the hand-held communication device, and cannot achieve the multiplexed and diversified functions of an ordinary computer operating system. For example, a Windows OS such as Windows XP or Windows VISTA used in a PC is capable of processing complicated tasks like text edition and frame processing, thus having a higher performance as compared with the Windows mobile OS. In order to improve the performance of the portable electronic devices, a brand new architecture integrating the portability of the Windows mobile OS and functionality of the Windows OS of a PC is developed.

In an actual application of foregoing system having dual operating systems, system resources are shared by the two operating systems, wherein one of the operating systems stands by while the other operating system works. When a user is about to stop the currently used operating system and switch to the other operating system, the user needs to press a switch button on the electronic device to switch to the desired operating system, and meanwhile, the interface displayed on the screen of the electronic device is also switched.

However, in foregoing system having dual operating systems, a processor is disposed in regard to each of the operating systems to execute the tasks assigned by the operating system. In an actual application, only the processor of one of the operating systems is used for executing tasks, and only the user interface of this operating system is displayed on the screen of the electronic device, and accordingly, the power supplied to the other operating system is wasted. Thereby, a suitable mechanism for managing the power supplied to two operating systems in an electronic device is required in order to reduce the power consumption of the electronic device and prolong the lifespan of a battery in the electronic device.

SUMMARY OF THE INVENTION

Accordingly, the present invention is directed to a system having multiple operating systems and an electronic device having the system, wherein a power button and a switch button are disposed and the power supplied to the operating systems is appropriately adjusted by an embedded controller so as to reduce the power consumption of the electronic device.

The present invention is directed to an operating method of an electronic device, wherein the power supply of the electronic device is appropriately adjusted according to the working states of multiple operating systems installed in the electronic device and the operation of a user so as to reduce the power consumption of the electronic device.

The present invention provides a system having multiple operating systems, wherein the system is suitable for an electronic device having a display. The system includes a first operating system, a second operating system, and an embedded controller. The first operating system consumes less power than the second operating system. The embedded controller receives an input signal to switch between the first operating system and the second operating system and display an interface of the switched first operating system or second operating system on a screen of the display. The first operating system and the embedded controller remain in an alive state after the electronic device is turned on, and the second operating system enters a non-working state after a preset idle time.

The present invention provides an electronic device including a display and a system having dual operating systems. The system includes a first operating system, a second operating system, and an embedded controller. The first operating system consumes less power than the second operating system. The embedded controller receives an input signal to switch between the first operating system and the second operating system and display an interface of the switched first operating system or second operating system on a screen of the display. The first operating system and the embedded controller remain in an alive state after the electronic device is turned on, and the second operating system enters a non-working state after a preset idle time.

According to an embodiment of the present invention, the embedded controller is activated when the electronic device is supplied with a power, and the first operating system and the second operating system are activated when the electronic device is turned on.

According to an embodiment of the present invention, the alive state includes one of a working state, a sleeping state, and a hibernating state, and the non-working state includes one of the sleeping state, the hibernating state, and a power-off state.

The present invention provides an operating method of an electronic device, wherein the operating method is suitable for operating the electronic device when the electronic device is supplied with a power. The electronic device has a display, a power button, and a switch button and is installed with a first operating system and a second operating system, wherein the first operating system consumes less power than the second operating system. The operating method includes: activating the first operating system and the second operating system and displaying the second operating system in an ON state when the power button is pressed; displaying the second operating system in the ON state or an OFF state when the first operating system works in the ON state and the switch button is pressed; displaying the first operating system in the ON state when the first operating system works in the OFF state and the switch button is pressed; and displaying the first operating system in the ON state when the second operating system works in the ON state or the OFF state and the switch button is pressed.

The present invention provides an operating method of an electronic device, wherein the operating method is suitable for operating the electronic device when the electronic device is supplied with a power. The electronic device has a display, a power button, and a switch button and is installed with a first operating system and a second operating system, wherein the first operating system consumes less power than the second operating system. The operating method includes: displaying the second operating system in an ON state or an OFF state when the first operating system works in the ON state and the switch button is pressed; displaying the first operating system in the ON state when the first operating system works in the OFF state and the switch button is pressed; displaying the first operating system in the ON state when the second operating system works in the ON state or the OFF state and the switch button is pressed; displaying the first operating system in the ON state when the first operating system works in the ON state, the second operating system works in the ON state, and the power button is pressed; displaying the second operating system in the ON state when the first operating system works in the ON state, the second operating system works in the OFF state, and the power button is pressed; displaying the second operating system in the ON state when the first operating system works in the OFF state and the power button is pressed; displaying the second operating system in the OFF state when the second operating system works in the ON state and the power button is pressed; and displaying the second operating system in the ON state when the second operating system works in the OFF state and the power button is pressed.

The present invention provides an operating method of an electronic device, wherein the operating method is suitable for operating the electronic device when the electronic device is supplied with a power and is turned on. The electronic device has a display, a power button, and a switch button and is installed with a first operating system and a second operating system, wherein the first operating system consumes less power than the second operating system. The operating method includes: displaying the second operating system in an ON state or an OFF state when the first operating system works in the ON state and the switch button is pressed; displaying the first operating system in the ON state when the first operating system works in the OFF state and the switch button is pressed; and displaying the first operating system in the ON state when the second operating system works in the ON state or the OFF state and the switch button is pressed.

The present invention provides an operating method of an electronic device, wherein the operating method is suitable for operating the electronic device when the electronic device is supplied with a power and is turned on. The electronic device has a display, a power button, and a switch button and is installed with a first operating system and a second operating system, wherein the first operating system consumes less power than the second operating system. The operating method includes: displaying the first operating system in an ON state when the second operating system works in the ON state or an OFF state and the switch button is pressed; displaying the second operating system in the ON state when the second operating system works in the OFF state and the power button is pressed; and displaying the second operating system in the OFF state when the second operating system works in the ON state and the power button is pressed.

According to an embodiment of the present invention, the ON state of the first operating system refers to that the display displays a working state of the first operating system, the OFF state of the first operating system refers to that the display displays a sleeping state of the first operating system, the ON state of the second operating system refers to that the display displays a working state of the second operating system, and the OFF state of the second operating system refers to that the display displays one of a sleeping state, a hibernating state, and a power-off state of the second operating system.

According to an embodiment of the present invention, the first operating system includes a Windows mobile operating system, and the second operating system includes a Windows operating system.

In the present invention, a system having dual operating systems is adopted in an electronic device, and a power button and a switch button are disposed in the electronic device for switching between the two operating systems. The switching between the operating systems and the display is controlled by an embedded controller according to the working states of the operating systems and the operation of a user so that the power consumption of the electronic device is effectively reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

While using an electronic device having dual operating systems, a user has to switch between the two operating systems because only one of the operation interfaces of the operating systems can be displayed on the screen of the electronic device. The power consumption of the electronic device can be considerably reduced if the power supplied to the two operating systems can be appropriately adjusted according to the working states of the two operating systems while the two operating systems are switched. The present invention provides an electronic device having dual operating systems and an operating method thereof based on foregoing concept. Embodiments of the present invention will now be described with reference to accompanying drawings.

Figure 1:
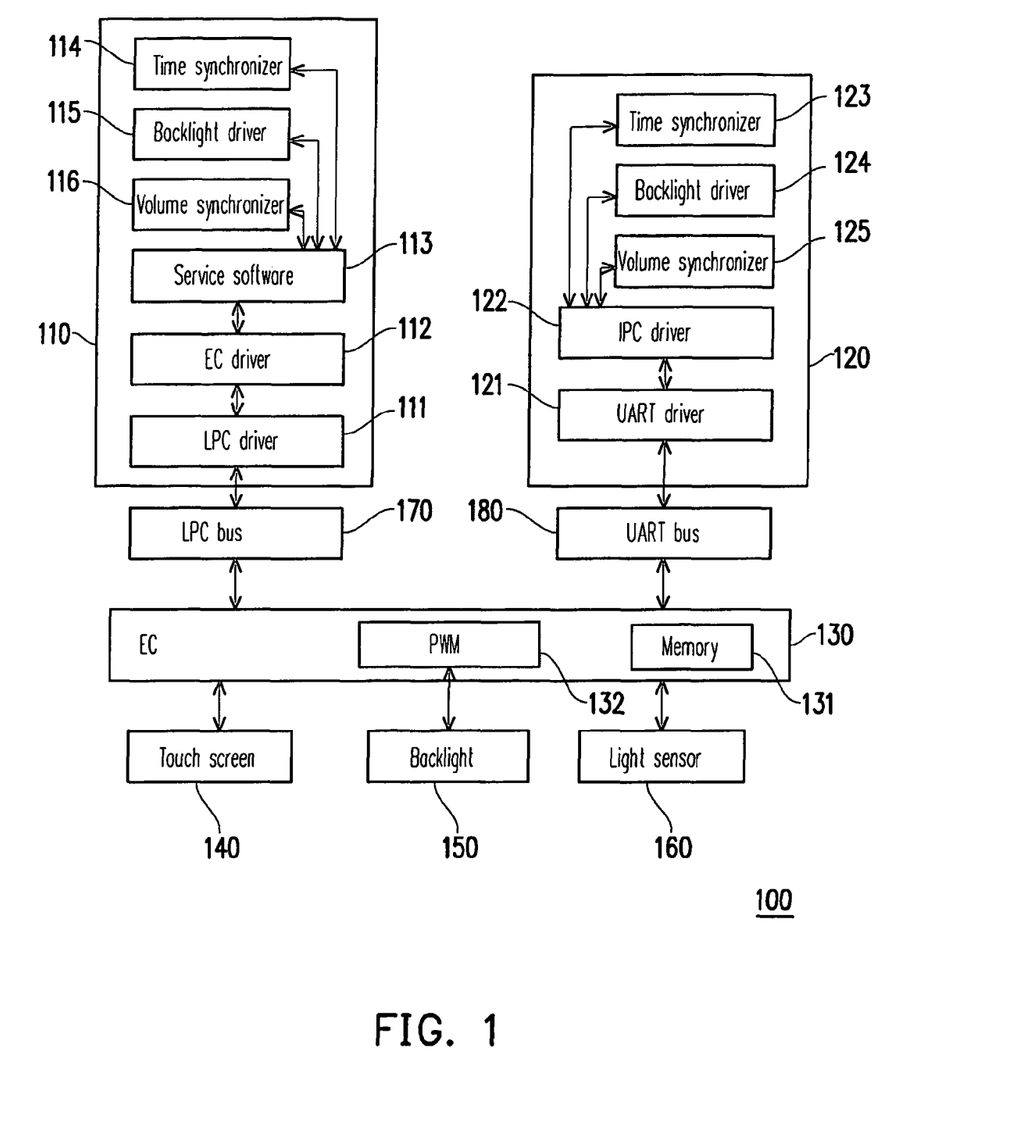
FIG. 1 is a block diagram of an electronic device having dual operating systems according to an embodiment of the present invention.

FIG. 1 is a block diagram of an electronic device having dual operating systems according to an embodiment of the present invention. Referring to FIG. 1, in the present embodiment, the electronic device 100 includes a Windows operating system 110 (for example, Windows XP or Windows VISTA), a Windows mobile operating system 120 (for example, Windows CE), and an embedded controller 130. The electronic device 100 may be a notebook computer, an ultra mobile PC (UMPC), or a personal digital assistant (PDA); however, the electronic device in the present invention is not limited thereto.

The embedded controller 130 is connected to the peripheral devices of the electronic device 100, such as a touch screen 140, a backlight module 150, and a light sensor 160. The peripheral devices may also include a keyboard, a battery, a network camera, a display, and speakers (not shown) etc, and all these peripheral devices are shared by the two operating systems.

Additionally, the embedded controller 130 is connected to a low pin count (LPC) bus 170 driven by a LPC driver 111 of the Windows operating system 110 and is driven by an embedded controller driver 112 to communicate with the Windows operating system 110 through a LPC interface. The embedded controller can communicate with a time synchronizer 114, a backlight module driver 115, and a volume synchronizer 116 of the Windows operating system 110 and accordingly control the operations of the peripheral devices of the electronic device 100, such as the backlight module 150 and the speakers (not shown), through a service software 113 of the Windows operating system 110.

Similarly, the embedded controller 130 is also connected to a universal asynchronous receiver transmitter (UART) bus 180 driven by a UART driver 121 of the Windows mobile operating system 120 to communicate with the Windows mobile operating system 120 through an UART interface. The embedded controller can communicate with a time synchronizer 123, a backlight module driver 124, and a volume synchronizer 125 of the Windows mobile operating system 120 and accordingly control the operations of the peripheral devices of the electronic device 100, such as the backlight module 150 and the speakers (not shown), through an inter-process communication (IPC) driver 122 of the Windows operating system 110. It should be noted that the LPC interface and the UART interface are used here only for describing the present invention but not for restricting the scope thereof, and those skilled in the art should be able to use other types of transmission interfaces according to the actual requirements.

In order to communicate between the Windows operating system 110, the Windows mobile operating system 120, and the embedded controller 130, a universal message format is adopted in the present invention. Any one of foregoing three units can request the other two units to execute particular tasks or can transmit data to the other units through message transmission. The message format will be described below.

Figure 2:
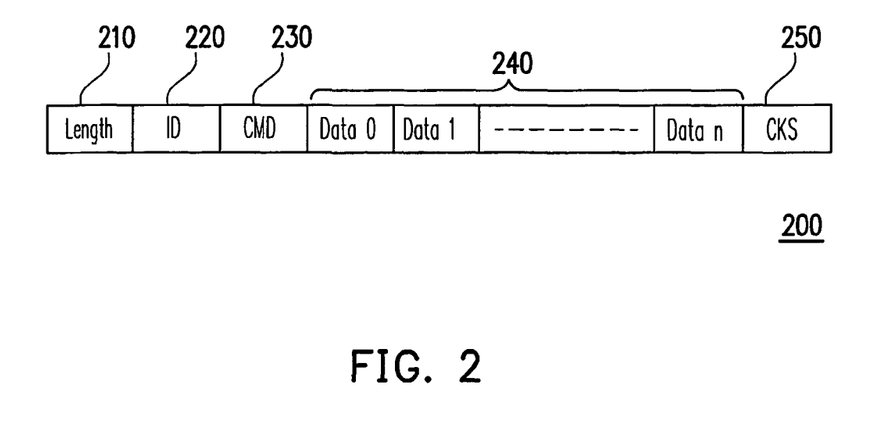
FIG. 2 is a diagram illustrating a message format according to an embodiment of the present invention.

FIG. 2 is a diagram illustrating the message format according to an embodiment of the present invention. Referring to FIG. 2, the message 200 starts with a length area 210 for indicating the valid length of the message 200. An identification (ID) area 220 is used to indicate the start point and end point for transmitting the message 200 is right after the length area 210. After that, a command (CMD) area 230 contains a command for instructing an end point unit. Next, a data area 240 contains a plurality of data Data 0~Data n required by the end point unit to executes the command. The last checksum (CKS) area 250 is used by the end point unit to determine whether the content of the message is complete.

Through the message transmissions in foregoing embodiment, communication channels between the Windows operating system 110, the Windows mobile operating system 120, and the embedded controller 130 can be established, so that the electronic device and the operating method thereof provided by the present invention can be implemented. The structure and function of the electronic device in the present invention will be described below.

First Embodiment

The electronic device in the present invention adopts a dual operating system structure including a Windows operating system (for example, Windows XP or Windows VISTA) and a Windows mobile operating system (for example, Windows CE), wherein the Windows operating system usually consumes more power than the Windows mobile operating system. In the present invention, the power supplied to these two operating systems is appropriately adjusted according to the change of the states of the two operating systems so as to reduce the power consumption of the electronic device. According to the specifications of the two operating systems, the Windows operating system has four states: a working state, a sleeping state, a hibernating state, and a power-off state, and the Windows mobile operating system has three states: a working state, a sleeping state, and a power-off state. Besides, each of the two operating systems has two display modes: a backlight ON mode and a backlight OFF mode.

It should be mentioned here that in the present embodiment, both the Windows operating system and the Windows mobile operating system are in the power-off state when a power is supplied to the electronic device but the electronic device is not yet turned on. However, once the electronic device is turned on, both the Windows operating system and the Windows mobile operating system in the electronic device are activated at the same time and enter the working state. At this time a frame of the Windows operating system changing from an OFF state to an ON state is displayed on a screen of the electronic device. In other words, the backlight of the screen is turned on to display the frame of the Windows operating system.

Figure 3:
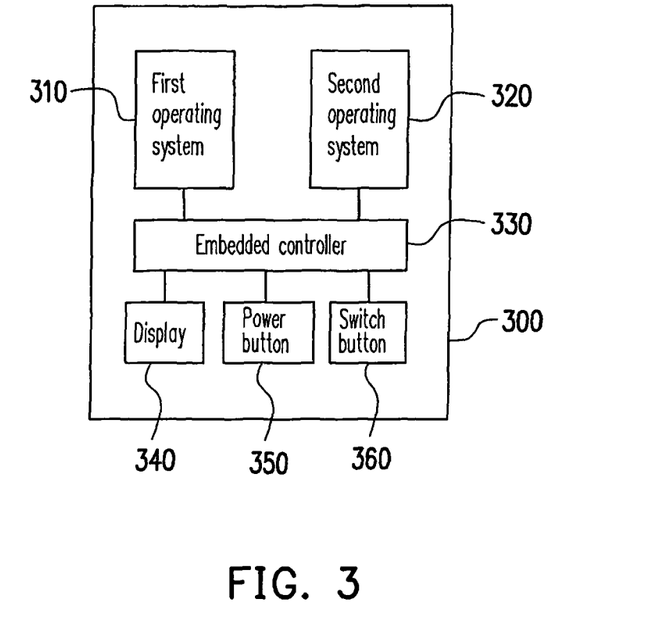
FIG. 3 is a block diagram of an electronic device according to a first embodiment of the present invention.

FIG. 3 is a block diagram of an electronic device according to the first embodiment of the present invention. Referring to FIG. 3, the electronic device 300 includes a first operating system 310, a second operating system 320, an embedded controller 330, a display 340, a power button 350, and a switch button 360. The first operating system 310, the second operating system 320, and the embedded controller 330 form a system having dual operating systems as illustrated in FIG. 1. In the present embodiment, it is assumed that the power consumed by the first operating system is less than that consumed by the second operating system, and the first operating system may be Windows CE, and the second operating system may be Windows XP or Windows VISTA.

The embedded controller 330 is activated when a power is supplied to the electronic device 300, and the first operating system 310 and the second operating system 320 are activated when the electronic device 300 is turned on by pressing down the power button 350. Then the embedded controller 330 can switch between the first operating system 310 and the second operating system 320 according to a received input signal and control the display 340 to display an interface of the switched operating system. It has to be mentioned here that after the electronic device 300 is turned on, the first operating system 310 and the embedded controller 330 remain in an alive state so as to instantly execute any task assigned by the electronic device 300. On the other hand, the second operating system 320 enters a non-working state after a preset idle time so as to reduce power consumption. The alive state may be a working state, a sleeping state, or a hibernating state, and the non-working state may be a sleeping state, a hibernating state, or a power-off state.

In the electronic device as described above, the Windows operating system which consumes more power is switched to the non-working state whenever it is idle so that the power consumption of the electronic device can be reduced. Instead, the Windows mobile operating system remains in the alive state so that the third generation (3G) wireless communication module or global positioning system (GPS) module applied in the Windows mobile operating system is available all the time and provide the Windows operating system and the Windows mobile operating system with the necessary operation support. The present invention further provides an efficient method for managing the power supply of foregoing electronic device having dual operating systems, and the method will be described below with reference to an embodiment of the present invention.

Second Embodiment

In the present embodiment, various terms and rules are defined in order to describe the operating method of an electronic device provided by the present invention conveniently. The electronic device operates and manages the power supplied to the operating systems according to these rules. These terms and rules are defined as following:

1. Along with elapsing of time, the Windows operating system may switch to one of a working state, a sleeping state, a hibernating state, and a power-off state according to user's definition, and the Windows mobile operating system may switch to one of a working state, a sleeping state, and a power-off state (i.e. the electronic device is powered off after the power is used up).

2. The working state (i.e. the ON state) of the Windows operating system refers to a standard working state, and the non-working state (i.e. the OFF state) of the Windows operating system includes a sleeping state, a hibernating state, and a power-OFF state. On the other hand, the working sate (i.e. the ON state) of the Windows mobile operating system refers to a standard working state, and the non-working state (i.e. the OFF state) of the Windows mobile operating system includes a sleeping state.

3. The alive state refers to that the Windows operating system or the Windows mobile operating system works in the working, sleeping, or hibernating state except the power-off state.

4. The Windows mobile operating system remains in the alive state during the operation of the electronic device unless the power supplied to the electronic device is cut off.

5. The symbol DWN (an initialism of Display Windows CE ON) represents that the Windows CE is displayed on the screen in the ON state, the symbol DWF (an initialism of Display Windows CE OFF) represents that the Windows CE is displayed on the screen in the OFF state, the symbol DVN (an initialism of Display Windows VISTA ON) represents that the Windows VISTA is displayed on the screen in the ON state, and the symbol DVF (an initialism of Display Windows VISTA OFF) represents that the Windows VISTA is displayed on the screen in the OFF state. It has to be mentioned that Windows CE is an embodiment of the Windows mobile operating system, and Windows VISTA is an embodiment of the Windows operating system.

Figure 4:
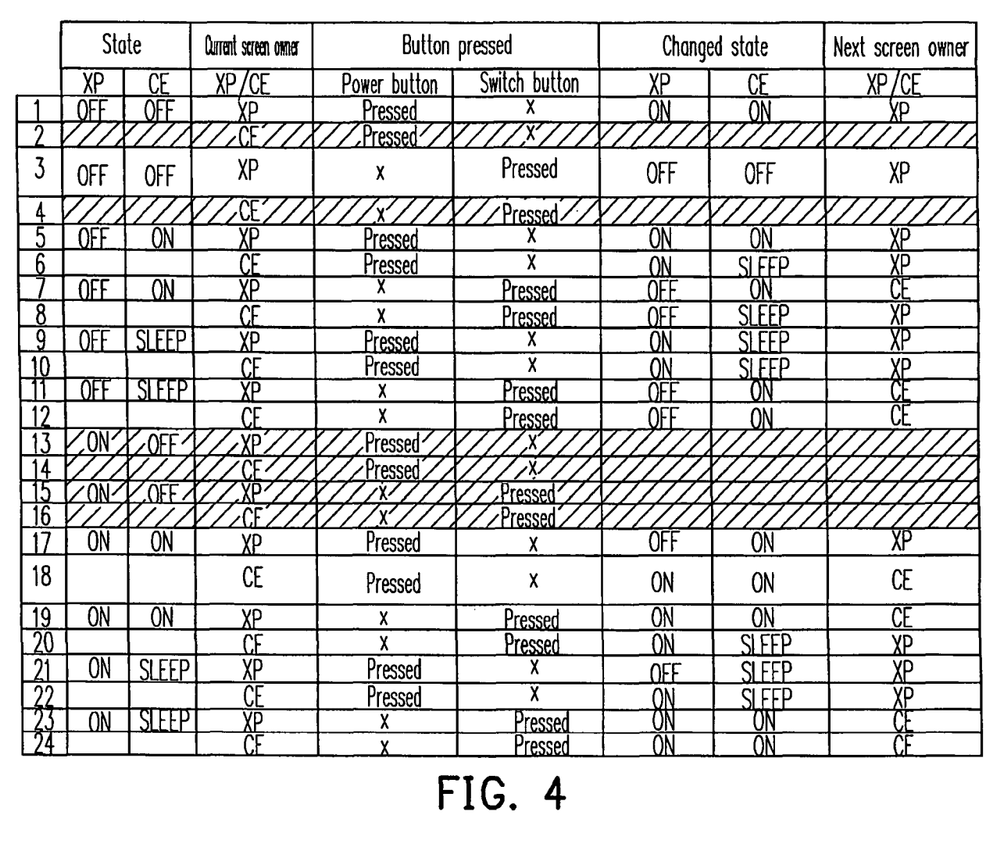
FIG. 4 illustrates a state transition table of an electronic device according to a second embodiment of the present invention.

FIG. 4 illustrates a state transition table of an electronic device according to the second embodiment of the present invention. Referring to FIG. 4, all the possible state transitions of the operating systems in the electronic device when a power button or a switch button of the electronic device is pressed down are listed in the table. The table can be divided into two parts. The first part contains rows 1~12, wherein the initial state of the Windows operating system is the OFF state. The second part contains rows 17~24, wherein the initial state of the Windows operating system is the ON state. The situations shown in rows 2, 4, and 13~16 are ignored.

In the present embodiment, both the power button and the switch button of the electronic device are connected to an embedded controller (as the embedded controller 130 in FIG. 1) which works independently so that both the power button and the switch button can send signals to the embedded controller and request the embedded controller to switch between the Windows operating system and the Windows mobile operating system. The power button is used for turning on or off the power supply of the electronic device, and the switch button is used independently or along with the power button for switching the frame of the operating system displayed on the screen of the electronic device. The power button or switch button may be physical buttons disposed on the electronic device or virtual buttons displayed on the screen of the electronic device; however, the scope of these buttons is not restricted in the present invention, and those skilled in the art should be able to implement the power button and the switch button by using different hardware or software according to the actual requirement.

Figure 5:
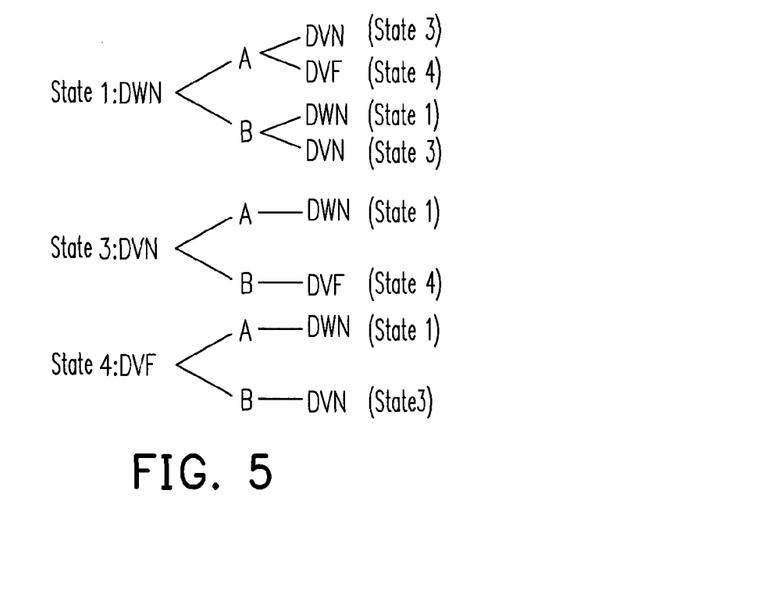
FIG. 5 is a diagram illustrating the simplified state transition result according to the state transition table illustrated in FIG. 4 when a power button or a switch button is pressed.

A diagram showing all the state transition results can be obtained based on the state transitions and the operations of the power button and the switch button as shown in FIG. 4. FIG. 5 is a diagram illustrating the simplified state transition results according to the state transition table illustrated in FIG. 4 when the power button or the switch button is pressed. Referring to FIG. 5, in the present embodiment, it is assumed that the electronic device is already turned on by pressing the power button. A represents the situation that the switch button is pressed, and B represents the situation that the power button is pressed. Besides, DWN represents that Windows CE is displayed on the screen in the ON state, DWF represents that Windows CE is displayed on the screen in the OFF state, DVN represents that Windows Vista is displayed on the screen in the ON state, and DVF represents that Windows VISTA is displayed on the screen in the OFF state.

In state 1 (DWN), it is assumed that the currently used operating system is Windows CE which is in the ON state. When the switch button (A) is pressed, whether Windows VISTA is originally in the ON state is further determined. If Windows VISTA is originally in the ON state, the currently used Windows CE is switched to Windows VISTA in the ON state (DVN), and if Windows VISTA is originally in the OFF state, the currently used Windows CE is switched to Windows VISTA in the OFF state (DVF). On the other hand, when the power button (B) is pressed, whether Windows VISTA is originally in the ON state is further determined. If Windows VISTA is originally in the ON state, Windows CE in the ON state (DWN) remains as the currently used operating system. Namely, the embedded controller of the electronic device does nothing to maintain Windows CE in the ON state; however, if Windows VISTA is originally in the OFF state, the currently used operating system is switched to Windows VISTA in the ON state (DVN).

In state 3 (DVN), it is assumed that the currently used operating system is Windows VISTA which is in the ON state. When the switch button (A) is pressed, the currently used operating system is switched from Windows VISTA to Windows CE, and Windows CE is switched to the ON state (DWN) regardless of the original state thereof. On the other hand, when the power button (B) is pressed, Windows VISTA remains as the currently used operating system, but the state thereof is switched to the OFF state (DVF).

In state 4 (DVF), it is assumed that the currently used operating system is Windows VISTA which is in the OFF state. When the switch button (A) is pressed, the currently used operating system is switched from Windows VISTA to Windows CE, and Windows CE is switched to the ON state (DWN) regardless of the original state thereof. On the other hand, when the power button (B) is pressed, Windows VISTA remains as the currently used operating system, but the state thereof is switched to the ON state (DVN).

Figure 6:
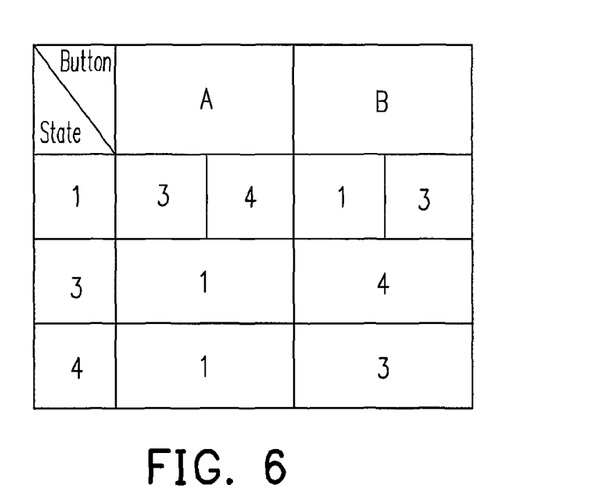
FIG. 6 illustrates a simplified table of the state transition result in FIG. 5 when the power button or the switch button is pressed.

FIG. 6 illustrates a simplified table of the state transition results in FIG. 5 when the power button or the switch button is pressed. Referring to FIG. 6, this table is corresponding to the various states described in foregoing embodiment. In state 1 (DWN), whether Windows VISTA is originally in the ON state is determined when the switch button (A) is pressed. If Windows VISTA is originally in the ON state, the current state is switched to state 3 (DVN); and if Windows VISTA is originally in the OFF state, the current state is switched to state 4 (DVF). Similarly, in state 1 (DWN), whether Windows VISTA is originally in the ON state is determined when the power button (B) is pressed. If Windows VISTA is originally in the ON state, the current state remains as state 1 (DWN), and if Windows VISTA is originally in the OFF state, the current state is switched to state 3 (DVN). The other situations can be deduced from the embodiment described above therefore will not be described herein.

At least four different situations can be deduced from the table, and the operation of the electronic device in these situations will be respectively described with reference to an embodiment of the present invention.

Third Embodiment

In the third embodiment, the electronic device is supplied with a power. Here one or both of the two operating systems in the electronic device are in the power-off state and the power button has to be pressed to trigger the initialization thereof. After that, the two operating systems are switched by pressing the switch button or the power button.

Figure 7:
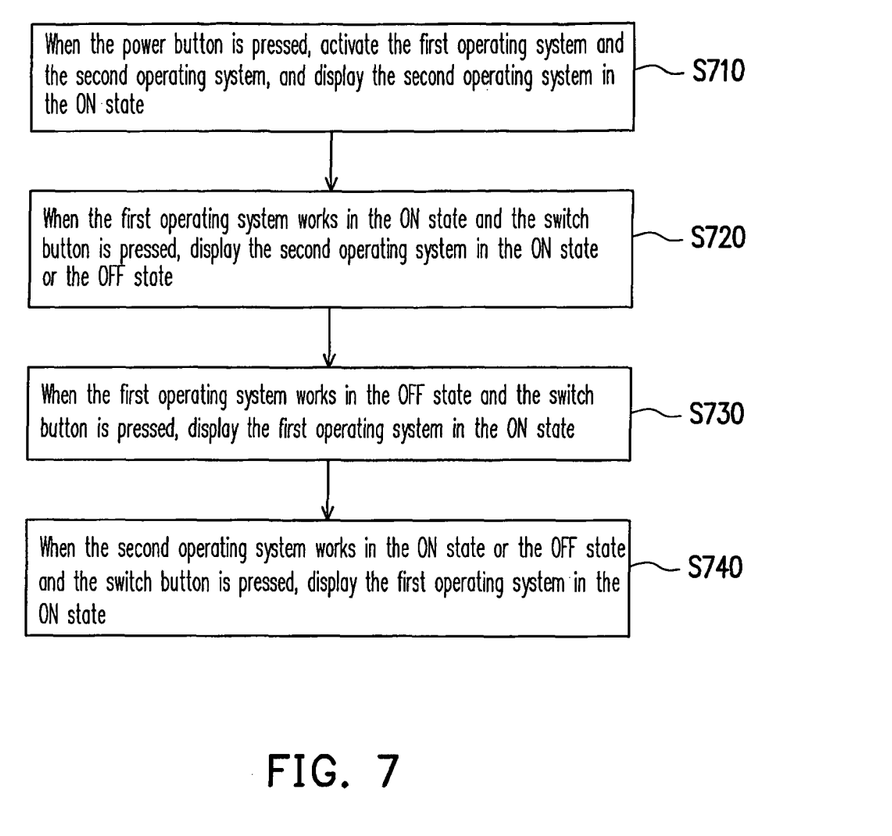
FIG. 7 is a flowchart illustrating an operating method of an electronic device according to a third embodiment of the present invention.

FIG. 7 is a flowchart illustrating an operating method of an electronic device according to the third embodiment of the present invention. Referring to FIG. 7, in the present embodiment, the electronic device is installed with a first operating system and a second operating system, wherein the first operating system consumes less power than the second operating system. The first operating system may be a Windows mobile operating system (for example, Windows CE), and the second operating system may be a Windows operating system (for example, Windows XP or Windows VISTA). It should be noted that in order to allow the operations of these operating systems to be more economical without affecting the performances thereof, the Windows mobile operating system remains in an alive state after the electronic device is turned on, and the Windows operating system works in an ON state or an OFF state.

First, when the power button is pressed, the first operating system and the second operating system are both activated, and the start-up process of the second operating system is displayed on a screen of the electronic device (step S710). For example, a frame of the Windows operating system is displayed on the screen when the power button of the electronic device is pressed.

Next, when the first operating system works in the ON state and the switch button is pressed, the second operating system in the ON state or the OFF state is displayed (step S720), wherein the displayed state of the second operating system is the state of the second operating system before the operating systems are switched.

When the first operating system works in the OFF state and the switch button is pressed, the first operating system in the ON state is displayed (step S730). In other words, when the first operating system is in the OFF state and the switch button is pressed, the first operating system is turned on instead of being switched with the second operating systems.

When the second operating system works in the ON state or the OFF state and the switch button is pressed, the first operating system in the ON state is displayed (step S740). In other words, the operating systems are switched when the switch button is pressed regardless of the state of the second operating system, and the first operating system remains in the ON state once the second operating system is switched to the first operating system.

It has to be mentioned here that because many functions provided by the Windows mobile operating system (for example, a third generation wireless communication module or a global positioning system module) may be used by the Windows operating system, the Windows mobile operating system remains in the ON state regardless of whether the Windows mobile operating system or the Windows operating system is displayed on the screen of the electronic device. An optimal power saving result can be achieved through the power management method as described above.

Fourth Embodiment

In the fourth embodiment, the electronic device is supplied with a power, and here one or both of the two operating systems in the electronic device may be in a power-off state, and the power button has to be pressed to trigger the initialization thereof. After that, the two operating systems are switched by pressing the switch button.

Figure 8:
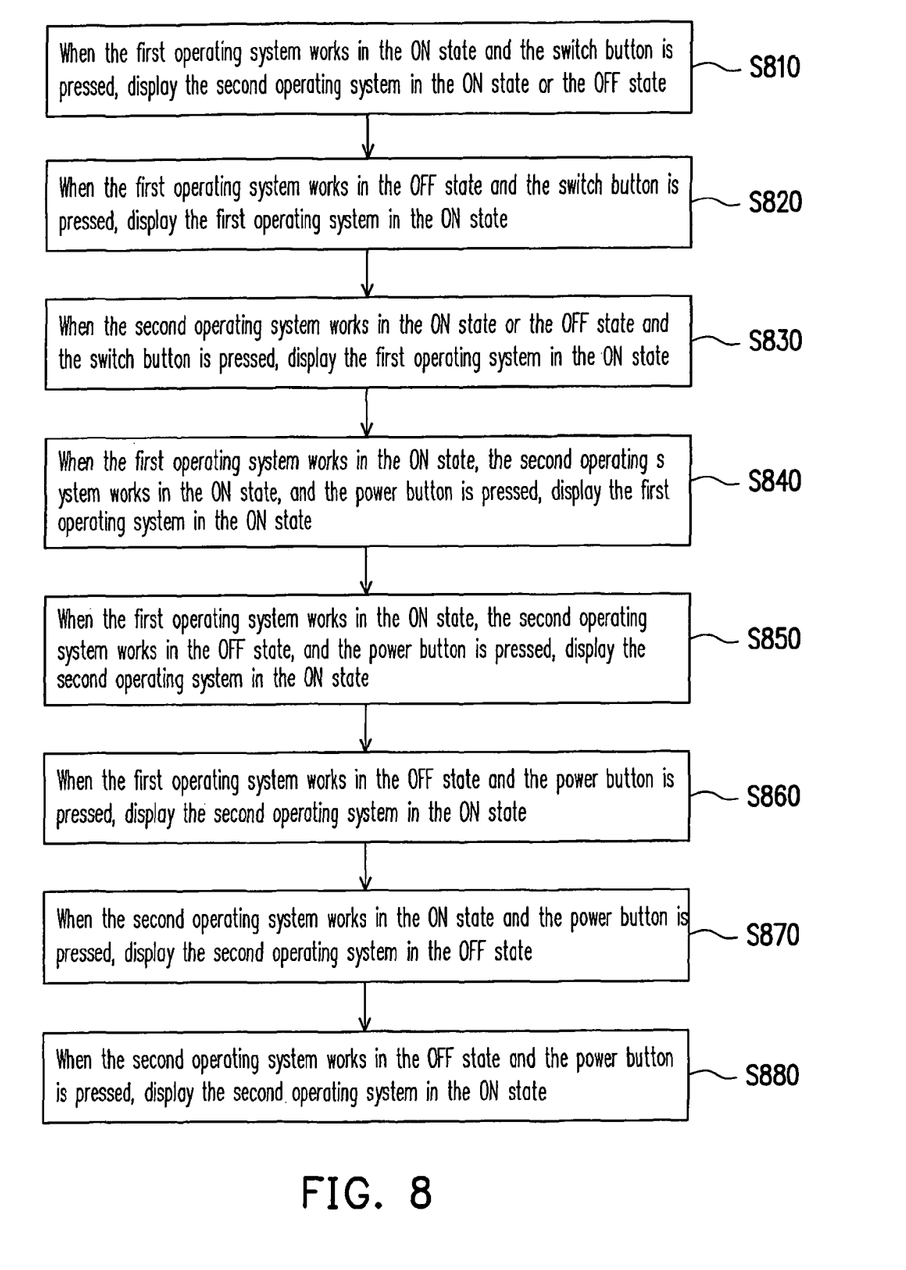
FIG. 8 is a flowchart illustrating an operating method of an electronic device according to a fourth embodiment of the present invention.

FIG. 8 is a flowchart illustrating an operating method of an electronic device according to the fourth embodiment of the present invention. Referring to FIG. 8, in the present embodiment, the electronic device is installed with a first operating system and a second operating system, wherein the first operating system consumes less power than the second operating system. The first operating system may be a Windows mobile operating system (for example, Windows CE), and the second operating system may be a Windows operating system (for example, Windows XP or Windows VISTA).

When the first operating system which works in the ON state is displayed on the screen of the electronic device, once the switch button is pressed, the second operating system is displayed on the screen and a frame of the second operating system is displayed on the screen in the ON state or the OFF state (step S810), wherein the displayed state of the second operating system is the state of the second operating system before the operating systems are switched.

However, when the first operating system works in the OFF state and the switch button is pressed, the first operating system is activated and displayed on the screen (step S820).

When the second operating system works in the ON state or the OFF state and the switch button is pressed, the first operating system is displayed in the ON state (step S830). In other words, the operating systems are switched once the switch button is pressed regardless of the state of the second operating system, and the first operating system remains in the ON state once the second operating system is switched to the first operating system.

When the first operating system works in the ON state, the second operating system works in the ON state, and the power button is pressed, the first operating system is displayed in the ON state (step S840). Contrarily, when the first operating system works in the ON state, the second operating system works in the OFF state, and the power button is pressed, the second operating system is activated and then displayed in the ON state (step S850). Namely, when the first operating system works in the ON state and the power button is pressed, the action taken is determined according to the state of the second operating system. If the second operating system is already turned on, the first operating system is still displayed in the ON state; otherwise, the second operating system is turned on and displayed in the ON state.

When the first operating system works in the OFF state and the power button is pressed, the second operating system is displayed in the ON state (step S860), and the first operating system remains in the OFF state.

When the second operating system works in the ON state and the power button is pressed, the second operating system is displayed in the OFF state (step S870); otherwise, when the second operating system works in the OFF state and the power button is pressed, the second operating system is displayed in the ON state (step S880). In other words, If the second operating system is currently displayed, the power button is only used for switching the second operating system between the ON and OFF state.

An optimal power saving result can be achieved through the power management method described above.

Fifth Embodiment

In the fifth embodiment, it is assumed that both the two operating systems in the electronic device have finished initialization and have been activated, which means both the Windows operating system and the Windows mobile operating system are activated and works in the ON state, and all the situations regarding switching between the two operating systems by using only the switch button are considered in the present embodiment.

Figure 9:
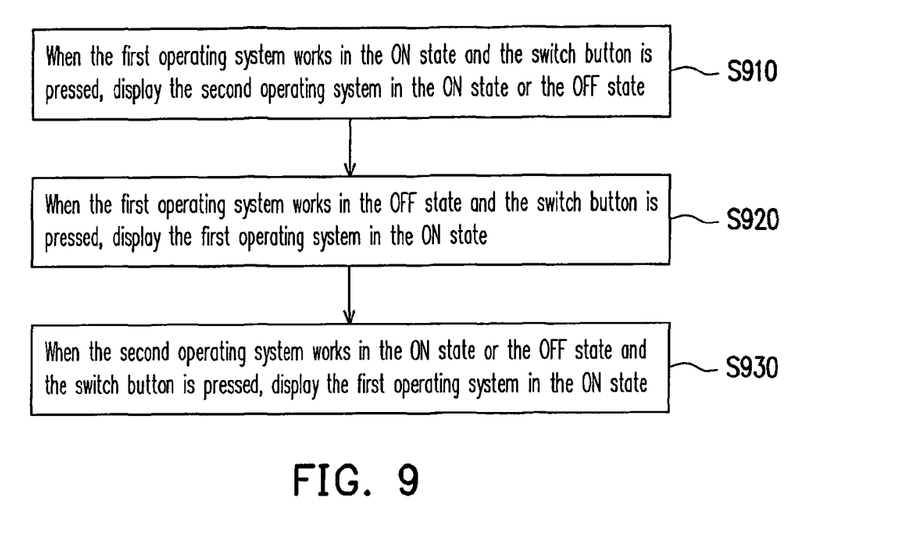
FIG. 9 is a flowchart illustrating an operating method of an electronic device according to a fifth embodiment of the present invention.

FIG. 9 is a flowchart illustrating an operating method of an electronic device according to the fifth embodiment of the present invention. Referring to the left part of FIG. 6 and FIG. 9, in the present embodiment, the electronic device is installed with a first operating system and a second operating system, wherein the first operating system consumes less power than the second operating system. The first operating system may be a Windows mobile operating system (for example, Windows CE), and the second operating system may be a Windows operating system (for example, Windows XP or Windows VISTA).

First, when the first operating system works in the ON state and the switch button is pressed, the second operating system is displayed in the ON state or the OFF state (step S910).

Next, when the first operating system works in the OFF state and the switch button is pressed, the first operating system is displayed in the ON state (step S920).

Finally, when the second operating system works in the ON state or the OFF state and the switch button is pressed, the first operating system is displayed in the ON state (step S930).

For example, in state 1 (DWN), the currently used operating system is Windows CE, and which can be switched to the Windows VISTA by pressing the switch button. However, the state of Windows VISTA will be considered when the switch button is pressed. If the Windows VISTA is originally in the ON state, Windows VISTA is displayed on the screen in the ON state when the switch button is pressed. Contrarily, if the Windows VISTA is originally in the OFF state, Windows VISTA is displayed in the OFF state when the switch button is pressed.

On the other hand, in state 3 (DVN) and state 4 (DVF), the currently used operating system is Windows VISTA. Here the switch button is used for switching from Windows VISTA to Windows CE, and Windows CE is displayed on the screen in the ON state.

Sixth Embodiment

In the sixth embodiment, it is assumed that both the two operating systems in the electronic device have finished initialization and have been activated, namely, the Windows operating system and the Windows mobile operating system are both activated and work in the ON state. In the present embodiment, all the situations regarding the operation of the electronic device when the switch button or the power button is pressed are considered only with the Windows operating system in the ON state or the OFF state.

Figure 10:
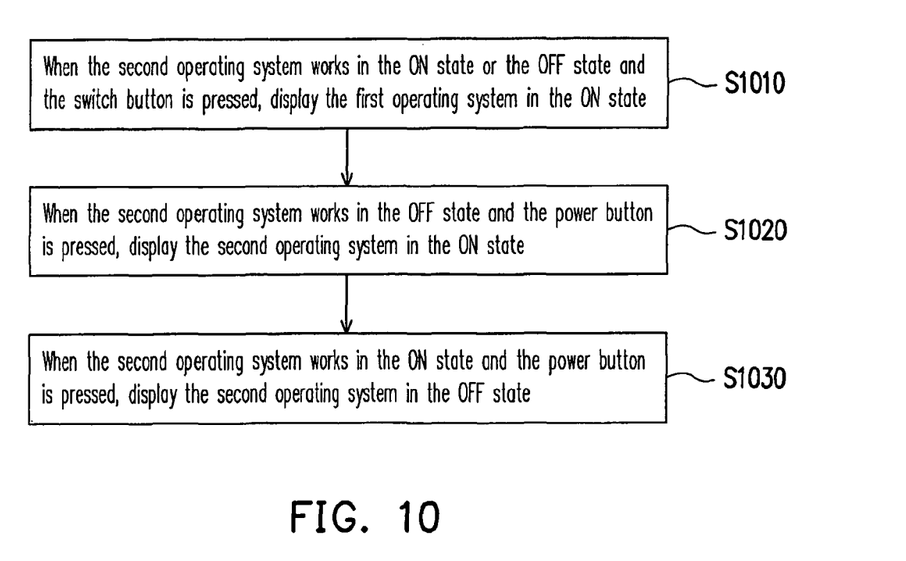
FIG. 10 is a flowchart illustrating an operating method of an electronic device according to a sixth embodiment of the present invention.

FIG. 10 is a flowchart illustrating an operating method of an electronic device according to a sixth embodiment of the present invention. Referring to the lower part of FIG. 6 and FIG. 10, in the present embodiment, the electronic device is installed with a first operating system and a second operating system, wherein the first operating system consumes less power than the second operating system. The first operating system may be a Windows mobile operating system (for example, Windows CE), and the second operating system may be a Windows operating system (for example, Windows XP or Windows VISTA).

First, when the second operating system works in the ON state or the OFF state and the switch button is pressed, the first operating system is displayed in the ON state (step S1010).

When the second operating system works in the OFF state and the power button is pressed, the second operating system is displayed in the ON state (step S1020).

When the second operating system works in the ON state and the power button is pressed, the second operating system is displayed in the OFF state (step S1030).

For example, referring to the lower part of the table in FIG. 6, the power button is used for switching Windows VISTA from the ON state to the OFF state or from the OFF state to the ON state. Regardless of the original state of Windows VISTA, the currently used operating system is always switched from Windows VISTA to Windows CE once the switch button is pressed.

On the other hand, the power button is used for switching Windows VISTA from the ON state to the OFF state or from the OFF state to the ON state according to the original state of Windows VISTA, and here Windows CE will remain in its original state.

Through the method described above, the power supply of an electronic device having dual operating systems can be efficiently managed. Since the Windows mobile operating system remains in an alive state after the electronic device is turned on, those modules (for example, a 3G module or a GPS module) of the Windows mobile operating system which are shared by the Windows operating system and the Windows mobile operating system can be available all the time so as to support the operations of both operating systems. Accordingly, an efficient method for managing the power consumption of an electronic device having dual operating systems is provided in the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An operating method of an electronic device, suitable for operating the electronic device when the electronic device is supplied with a power, wherein the electronic device has a display, a power button, and a switch button and is installed with a first operating system and a second operating system, wherein the first operating system consumes less power than the second operating system, the operating method comprising:
   activating the first operating system and the second operating system and displaying the second operating system in an on state when the power button is pressed;
   displaying the second operating system in the on state or an off state when the first operating system works in the on state and the switch button is pressed; and
   displaying the first operating system in the on state when the second operating system works in the on state or the off state and the switch button is pressed.

2. The operating method according to claim 1, wherein the on state of the first operating system refers to that the display displays a working state of the first operating system, the off state of the first operating system refers to that the display displays a sleeping state of the first operating system, the on state of the second operating system refers to that the display displays a working state of the second operating system, and the off state of the second operating system refers to that the display displays one of a sleeping state, a hibernating state, and a power-off state of the second operating system.

3. An operating method of an electronic device, suitable for operating the electronic device when the electronic device is supplied with a power, wherein the electronic device has a display, a power button, and a switch button and is installed with a first operating system and a second operating system, wherein the first operating system consumes less power than the second operating system, the operating method comprising:
   displaying the second operating system in an on state or an off state when the first operating system works in the on state and the switch button is pressed;
   displaying the first operating system in the on state when the second operating system works in the on state or the off state and the switch button is pressed;
   displaying the first operating system in the on state when the first operating system works in the on state, the second operating system works in the on state, and the power button is pressed;
   displaying the second operating system in the on state when the first operating system works in the on state, the second operating system works in the off state, and the power button is pressed;
   displaying the second operating system in the off state when the second operating system works in the on state and the power button is pressed; and
   displaying the second operating system in the on state when the second operating system works in the off state and the power button is pressed.

4. The operating method according to claim 3, wherein the on state of the first operating system refers to that the display displays a working state of the first operating system, the off state of the first operating system refers to that the display displays a sleeping state of the first operating system, the on state of the second operating system refers to that the display displays a working state of the second operating system, and the off state of the second operating system refers to that the display displays one of a sleeping state, a hibernating state, and a power-off state of the second operating system.

5. An operating method of an electronic device, suitable for operating the electronic device when the electronic device is supplied with a power and is turned on, wherein the electronic device has a display, a power button, and a switch button and is installed with a first operating system and a second operating system, wherein the first operating system consumes less power than the second operating system, the operating method comprising:
   displaying the second operating system in an on state or an off state when the first operating system works in the on state and the switch button is pressed; and
   displaying the first operating system in the on state when the second operating system works in the on state or the off state and the switch button is pressed.

6. The operating method according to claim 5, wherein the on state of the first operating system refers to that the display displays a working state of the first operating system, the off state of the first operating system refers to that the display displays a sleeping state of the first operating system, the on state of the second operating system refers to that the display displays a working state of the second operating system, and the off state of the second operating system refers to that the display displays one of a sleeping state, a hibernating state, and a power-off state of the second operating system.

7. An operating method of an electronic device, suitable for operating the electronic device when the electronic device is supplied with a power and is turned on, wherein the electronic device has a display, a power button, and a switch button and is installed with a first operating system and a second operating system, wherein the first operating system consumes less power than the second operating system, the operating method comprising:
   displaying the first operating system in an on state when the second operating system works in the on state or an off state and the switch button is pressed;
   displaying the second operating system in the on state when the second operating system works in the off state and the power button is pressed; and
   displaying the second operating system in the off state when the second operating system works in the on state and the power button is pressed.

8. The operating method according to claim 7, wherein the on state of the first operating system refers to that the display displays a working state of the first operating system, the off state of the first operating system refers to that the display displays a sleeping state of the first operating system, the on state of the second operating system refers to that the display displays a working state of the second operating system, and the off state of the second operating system refers to that the display displays one of a sleeping state, a hibernating state, and a power-off state of the second operating system.

* * * * *